(12) United States Patent
Katchko et al.

(10) Patent No.: US 8,067,087 B2
(45) Date of Patent: Nov. 29, 2011

(54) HEAT SEAL ADHESIVE PAPER PRODUCT, METHOD FOR MANUFACTURING, AND LAMINATE PRODUCT

(75) Inventors: John E. Katchko, Rhinelander, WI (US); David Langton, Mosinee, WI (US); Susan Feit, Mosinee, WI (US); Bruce C. Unruh, Harshaw, WI (US)

(73) Assignee: Wausau Paper Mills, LLC, Mosiness, WI (US)

( * ) Notice: Subject to any disclaimer, the term of this patent is extended or adjusted under 35 U.S.C. 154(b) by 596 days.

(21) Appl. No.: 11/222,672

(22) Filed: Sep. 8, 2005

(65) Prior Publication Data

US 2007/0054117 A1  Mar. 8, 2007

(51) Int. Cl.
*B32B 7/12* (2006.01)

(52) U.S. Cl. .................................. 428/343; 428/354

(58) Field of Classification Search ................. 428/343, 428/354
See application file for complete search history.

(56) References Cited

U.S. PATENT DOCUMENTS

| | | | |
|---|---|---|---|
| 3,734,874 A | 5/1973 | Kibler et al. | |
| 3,779,993 A | 12/1973 | Kibler et al. | |
| 4,054,717 A | 10/1977 | Gill et al. | |
| 4,233,196 A | 11/1980 | Sublett | |
| 4,928,875 A | 5/1990 | Hutchinson | |
| 5,281,474 A * | 1/1994 | Matsuzaki et al. | 428/349 |
| 5,543,488 A | 8/1996 | Miller et al. | |
| 5,552,495 A | 9/1996 | Miller et al. | |
| 5,552,511 A | 9/1996 | Miller et al. | |
| 5,553,943 A | 9/1996 | Cook et al. | |
| 5,571,876 A | 11/1996 | Miller et al. | |
| 5,718,790 A | 2/1998 | Miller et al. | |
| 5,744,538 A | 4/1998 | Miller et al. | |
| 5,780,151 A | 7/1998 | Miller et al. | |
| 5,859,152 A | 1/1999 | Miller et al. | |
| 5,928,460 A | 7/1999 | Miller et al. | |
| 6,007,910 A | 12/1999 | Miller et al. | |
| 6,124,032 A | 9/2000 | Bloch et al. | |
| 6,193,641 B1 | 2/2001 | Barker | |
| 2003/0035944 A1 | 2/2003 | Blackwell | |
| 2004/0121079 A1 | 6/2004 | Urscheler et al. | |
| 2005/0121444 A1 | 6/2005 | Trochlil | |

FOREIGN PATENT DOCUMENTS

JP  04307287 A  * 10/1992

OTHER PUBLICATIONS

Derwent abstract of JP 04307287A.*
Mosher, R., & Davis, D., Industrial and Specialty Papers, vol. III-Applications, Chemical Publishing Company, Inc., © 1969, pp. 345-348.
Resolution Specialty Materials, Technical Innovation for Unique Customer Needs, Published Aug. 2004, pp. 1-5.

(Continued)

*Primary Examiner* — Victor Chang
(74) *Attorney, Agent, or Firm* — Merchant & Gould, P.C.

(57) ABSTRACT

A heat seal adhesive paper product is provided according to the invention. The heat seal adhesive paper product comprises a paper substrate and a heat activatable adhesive. The heat activatable adhesive comprises a result of applying an aqueous polymer dispersion to the paper substrate to form a coated paper substrate and drying the coated paper substrate. The aqueous polymer dispersion includes a polymer component having a melting temperature ($T_m$) greater than about 220° F. and a glass transition temperature ($T_g$) greater than about 50° F. A method for manufacturing a heat seal adhesive paper product is provided and a laminate product containing the heat seal adhesive paper product is provided.

15 Claims, 3 Drawing Sheets

OTHER PUBLICATIONS

Resolution Specialty Materials, Material Safety Data Sheet for Synthebond SP-254 © 2003, pp. 1-5.

J. R. Crompton Ltd., SUPERSEAL® heatsealable paper products, 3 pages, date unknown.

* cited by examiner

HEAT SEAL ADHESIVE PAPER PRODUCT, METHOD FOR MANUFACTURING, AND LAMINATE PRODUCT

FIELD OF THE INVENTION

The invention relates to a heat seal adhesive paper product, a method for manufacturing a heat seal adhesive paper product, and a laminate product prepared from a heat seal adhesive paper product.

BACKGROUND OF THE INVENTION

Heat seal adhesive paper is available that forms a bond to itself or another material as a result of application of heat. Heat seal adhesive paper can be referred to as dry bond paper. Heat seal adhesive paper is available having a coating that, when heated to a sufficient temperature, forms a bond with another substrate. The coating can be applied by extrusion coating. Exemplary coatings include wax (e.g., paraffin wax), ethylene vinyl acetate, polyethylene, polypropylene, polyvinyl (e.g., polyvinyl butyral), and cellulose derivatives. Exemplary products that include dry bond paper include sugar packets, tea bag packets, and various types of process food containing bags or pouches.

A general discussion of heat sealing papers under the combined action of heat and pressure can be found in Robert H. Mosher and Dale S. Davis, Industrial and Specialty Papers, Vol. III-Applications, Chemical Publishing Company, Inc., 1969, pages 345-348.

SUMMARY OF THE INVENTION

A heat seal adhesive paper product is provided according to the invention. The heat seal adhesive paper product comprises a paper substrate and a heat activatable adhesive. The heat activatable adhesive comprises a result of applying an aqueous polymer dispersion to the paper substrate to form a coated paper substrate and drying the coated paper substrate. The aqueous polymer dispersion includes a polymer component having a melting temperature ($T_m$) greater than about 220° F. and a glass transition temperature ($T_g$) greater than about 50° F.

Methods for manufacturing a heat seal adhesive paper product are provided according to the invention. In one embodiment of the method for manufacturing a heat seal adhesive paper product, an aqueous polymer dispersion is applied to a paper substrate, wherein the aqueous polymer dispersion includes a polymer component having a melting temperature ($T_m$) greater than about 220° F. and a glass transition temperature ($T_g$) greater than about 50° F. In another embodiment of the method for manufacturing a heat seal adhesive paper product, the method includes applying an aqueous polymer dispersion to a paper substrate to form a coated paper substrate, and drying the coated paper substrate using contact rolls to provide the heat seal adhesive paper product.

A laminate product is provided according to the invention. The laminate comprises a result of heat sealing a heat seal adhesive paper product and a substrate. Exemplary substrates include foil, paper, and film such as polymer film. Exemplary products that can be made using the laminate include packaging for containing food, medical heat seal paper, heat seal tape, packaging tape, and labels.

DETAILED DESCRIPTION OF THE INVENTION

Figure 1:
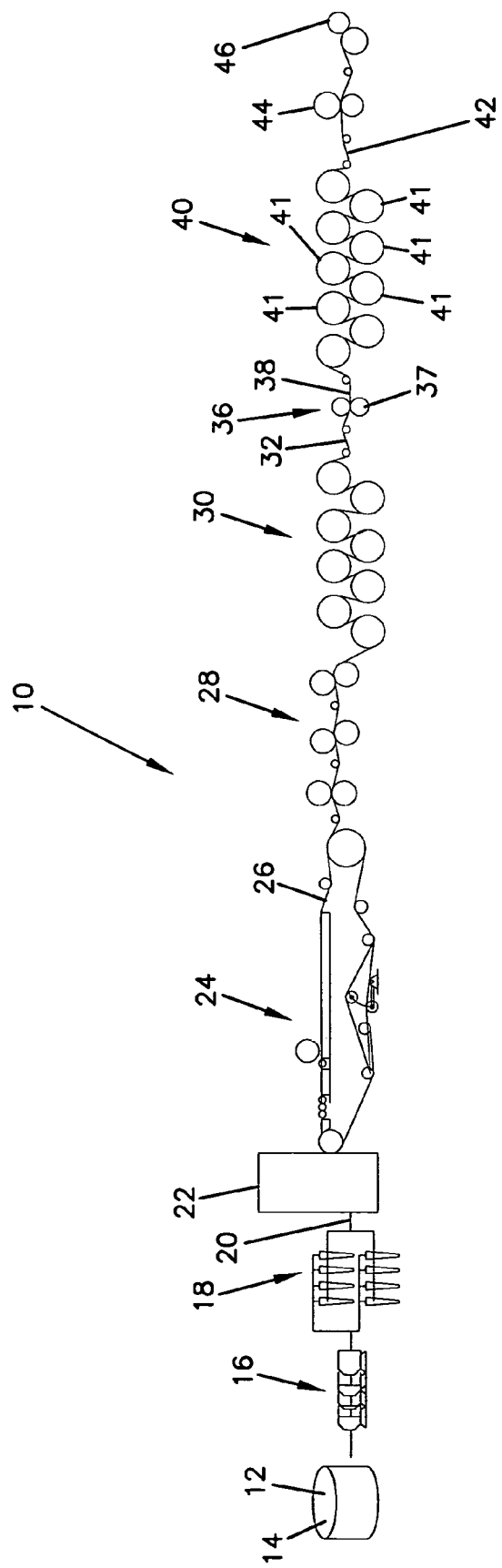
FIG. 1 is a diagrammatic view of an exemplary process for manufacturing a heat seal adhesive paper product according to the principles of the invention.

A heat seal adhesive paper product can be provided having a paper substrate and at least one heat activatable adhesive layer. A heat activatable adhesive layer can be provided on one or both sides of the paper substrate. The heat activatable adhesive layer includes a heat activatable adhesive. The heat seal adhesive paper product can be referred to more simply as the paper product.

The heat activatable adhesive forms an active adhesive when it is brought to a heat bond activation temperature. The heat bond activation temperature refers to the temperature at which the activatable adhesive becomes sufficiently "open" so that it acts as an adhesive for bonding the heat seal adhesive paper product to another substrate. Once the temperature of the activatable adhesive goes below the heat bond activation temperature, the activatable adhesive loses its openness. The heat activatable adhesive may or may not be characterized as tacky when provided at a temperature above the heat bond activation temperature. The heat activatable adhesive can be provided as a type of hot melt adhesive in the sense that once the heat activatable adhesive is brought to at least a heat bond activation temperature, the heat activatable adhesive flows sufficiently so that it can contact at least two substrates and provide bonding between the two substrates when the temperature of the heat activatable adhesive decreases to below the heat bond activation temperature.

The heat seal adhesive paper product can bond to itself or to another substrate to form a heat seal adhesive paper product laminate. The heat seal adhesive paper product laminate can be referred to more simply as the product laminate or as the laminate. The product laminate includes at least a paper substrate, a heat activatable adhesive layer, and a second substrate. The second substrate can be a paper substrate or another substrate. The paper substrate can be a paper substrate without a heat activatable adhesive layer or a paper substrate with a heat activatable adhesive layer. That is, the second substrate can be a heat seal adhesive paper product. In addition, the second substrate can be another substrate such as metal or a polymer. An exemplary metal substrates include foil (e.g., aluminum foil). Exemplary polymer substrates include films, sheets, plastic containers, and plastic articles. In general, the second substrate can be any material that bonds with the heat seal adhesive paper product.

A laminate product can be formed by bonding the heat seal adhesive paper product to a second substrate. It should be understood that the phrase "second substrate" refers to a substrate that bonds to the heat seal adhesive paper product. The paper product that forms the heat seal adhesive paper product can be referred to as the first substrate. The first substrate and the second substrate can be the same or different.

Various applications for a laminate product prepared from a heat seal adhesive paper product and a second substrate include those applications where it may be desirable to provide a laminate product exhibiting desired properties such as, for example, water vapor transmission rate (WVTR), moisture vapor transmission rate (MVTR), oxygen transmission properties, grease resistance, oil resistance, tensile strength, water resistance, electrical conductivity or insulation, or thermal conductivity or insulation. The heat seal adhesive paper product and/or the second substrate can be provided so that the resulting product laminate exhibits the properties desired for the product laminate. In the case of a second substrate being foil, it can be desirable for the paper product (the first substrate) to bond to the foil to provide the laminate product with a texture or substance as a result of the paper substrate and water vapor transmission rate properties as a result of the foil. The foil can be used to provide the laminate product with desired electrical conductivity or insulation properties or desired thermal conductivity or insulation properties.

Various applications for the heat seal adhesive paper product include packaging applications, labeling applications, tape applications, conductivity applications, and insulation applications. Exemplary packaging applications include packaging for food products and packaging for medical products. Exemplary food products that can be packaged with the heat seal adhesive paper product include snack food product, popcorn products, meat products, cheese products, etc. Exemplary medical products that can be packaged with the heat seal adhesive paper product include gloves, bandages, syringes, operating instruments, and medical devices.

The heat activatable adhesive layer can be provided on the paper substrate as a result of applying an aqueous polymer dispersion to the paper substrate. A heat activatable adhesive layer provided as a result of applying an aqueous polymer dispersion is different from a heat activatable adhesive layer provided by extrusion coating. In general, extrusion coating refers to the melting of the composition and applying the melt as a coating such as a film. Extrusion coated compositions are often referred to as 100% solids. It should be understood that not all extrusion coated compositions are, in fact, 100% solids, and some may contain water or organic solvent. Nevertheless, extrusion coated compositions are applied as a melt to form a coating on a substrate. In contrast, an aqueous polymer dispersion can be applied to a substrate without the use of an extruder and without melting the composition.

The aqueous polymer dispersion can be applied to the paper substrate either "on machine" or "off machine." Application of the aqueous polymer dispersion to the paper substrate on machine refers to the application of the aqueous polymer dispersion during the paper making process. When applied on machine, the aqueous polymer dispersion is applied to the paper substrate at some point after the paper is formed but before the paper is taken up in a roll. Application of the aqueous polymer dispersion off machine refers to the application of the aqueous polymer dispersion to the paper substrate after the paper substrate has been taken up in a roll as a result of the paper making process. When applied off machine, the roll of paper can be transferred to another processing line or to another facility (or to a converter) where the aqueous polymer dispersion can be applied to the paper substrate.

Adhesive compositions are commonly applied to paper off machine. One reason for this is that the temperatures and equipment used in the paper making process are not very well suited for handling a paper substrate containing a conventional adhesive composition. Because of the high temperatures that are typically used during the paper making process, the application of an adhesive composition to paper during the paper making process can generally be expected to result in blocking of the paper when it is rolled up. Blocking refers to the adhesion of a substrate to itself. In the case of an adhesive composition applied to paper, if the adhesive is tacky when the paper is rolled up, it is generally expected that the paper will adhere to itself and it may be very difficult to unroll the paper. Furthermore, the paper making process often utilizes contact dryers (e.g., steam cans). The application of an adhesive composition to the paper substrate during the paper making process may be expected to result in transfer of the adhesive to the contact dryers, and may result in transfer of paper fiber or the paper itself to the contact dryers. Depending on the type of adhesive composition used, it may be fairly difficult to remove the adhesive, the adhesive and paper fiber, or the adhesive and paper from the contact dryers. In addition, continued build-up of adhesive or the adhesive and paper on the contact dryers may be problematic and may wrap the dryer can and break the web. In view of the general difficulty of applying an adhesive to paper during the paper making process, adhesives are typically applied to paper off machine where special equipment, such as non-contact dryers, are used for processing the paper. Exemplary non-contact dryers include air dryers, infrared dryers, and gas dryers where the coated surface is not contacted. The need for special processing equipment and the need to transfer the paper to another line off machine results in added expense in the production of heat seal adhesive paper. Paper stock is often shipped to a "converter" for the application of an adhesive layer using relatively specialized equipment. The extra processing steps involved in shipping paper stock to a converter for application of an adhesive results and the use of relatively specialized equipment results in increased cost.

The heat activatable adhesive layer can be provided on a paper substrate as a result of application of an aqueous polymer dispersion to the paper substrate. The aqueous polymer dispersion can be provided as a flowable dispersion of polymer in water that can be applied to a surface of the paper substrate to form a coating layer. The aqueous polymer dispersion can remain on the surface of the paper substrate, it can flow into the paper substrate, or it can flow into the paper substrate and still remain as a layer on the paper substrate. In order to reduce the amount of the aqueous polymer dispersion used to form a heat activatable adhesive layer on a paper substrate while providing desired adhesive properties, it may be desirable to maximize the amount of the aqueous polymer dispersion on the surface of the paper substrate and to reduce penetration of the aqueous polymer dispersion into the paper substrate. The paper substrate can be controlled to provide the desired level of penetration or lack of penetration of the aqueous polymer dispersion into the paper substrate. For example, the paper substrate can include a sizing agent to reduce penetration of the aqueous polymer dispersion into the paper substrate. In addition, the level of refining of the pulp can influence the degree of penetration of the aqueous polymer dispersion into the paper substrate. A more highly refined pulp has a tendency to provide paper having fewer holes or openings in which the aqueous polymer dispersion can penetrate. In addition, the water content of the paper substrate can be controlled to reduce or permit penetration of the aqueous polymer dispersion. A paper substrate that is relatively wet can generally permit more penetration of the aqueous polymer dispersion compared with a paper substrate that is relatively dry. Accordingly, a number of factors can be adjusted to provide the desired level of penetration.

Refining is the treatment of pulp fibers to develop their papermaking properties. Refining increases the surface area of the fibers making the fibers more pliable to conform around each other which increases the bonding surface area and leads to a denser sheet with fewer voids. The level of refining of the pulp can be selected to provide a paper substrate and reduce the amount of penetration of the aqueous polymer dispersion into the paper substrate. In general, the lower the Canadian freeness value of the pulp used to make the paper substrate, the lower the expected penetration of the aqueous polymer dispersion into the paper substrate. In general, a paper substrate having a Canadian freeness value of greater than about 500 cm³ is expected to be considered fairly open and can provide a large degree of penetration. At a Canadian freeness value of less than about 400 cm³, the paper substrate tends to become more closed and reduces penetration of the aqueous polymer dispersion into the paper substrate. In order to further reduce penetration of the aqueous polymer dispersion into the paper substrate, the paper substrate can be manufactured having a Canadian freeness value of less than about 200 cm³, and can be provided having a Canadian freeness value of less than about 50 cm³. The extent to which a paper product is made with refined fibers can be measured by various techniques. One type of testing for refined fibers is referred to as freeness testing. In freeness testing, the speed water drains through a sample paper is measured. Because paper made with highly refined fibers has fewer voids and smaller holes, it takes longer to drain through a sheet of paper with highly refined fibers. A standard for freeness testing is the Canadian standard freeness (CSF) test. The CSF test was developed for use with groundwood pulps and was not intended for use with chemical pulps; nevertheless, it is the standard test for monitoring refining in North American mills. TAPPI (Technical Association of the Pulp and Paper Industry) standard test T-227 corresponds to the CSF test. Another common test of the refined nature of paper is the Schopper Riegler test, which is similar in concept to the CSF test.

Sizing agents can be applied to a paper substrate to reduce penetration of the aqueous polymer dispersion into the paper substrate. In general, the sizing agent can be used to close up the surface of the paper substrate and provide a level of water resistance, oil resistance, or both water resistance and oil resistance. Exemplary sizing agents that can be used include rosin, alkyl ketene dimer (AKD), alkenyl succinic anhydride (ASA), stearylated melamine, wax emulsions, styrene maleic anhydride (SMA), latex, ethylene acrylic acid (EAA), cationic styrene-based polymers, fluorochemicals, or mixtures thereof.

The water content of the paper substrate can be controlled prior to application of the aqueous polymer dispersion to limit the penetration of the aqueous polymer dispersion into the paper substrate. In general, a paper substrate having a higher content of water can be more easily penetrated by an aqueous polymer dispersion. Accordingly, by drying the paper substrate to a desired water content, one can reduce the extent of penetration of the aqueous polymer dispersion into the paper substrate. For example, it may be desirable to reduce the water content of the paper substrate to less than about 5 wt. % to reduce the level of penetration of the aqueous polymer dispersion into the paper substrate. It may be more desirable to reduce the water content of the paper substrate to less than about 2 wt. % to reduce the level of penetration of the aqueous polymer dispersion into the paper substrate.

Another technique for reducing the penetration of the aqueous polymer dispersion into the paper substrate includes thickening the aqueous polymer dispersion. This can include thickening the polymer component of the aqueous polymer dispersion so that it lays on top of the paper substrate and does not penetrate too deeply into the paper substrate.

The aqueous polymer dispersion can be provided so that it is sufficiently flowable so that it can be applied to a paper substrate using conventional paper coating equipment. Exemplary paper coating equipment that can be used to apply the aqueous polymer dispersion include size presses, roll coaters, gate-roll coaters, blade coaters, bill blade coaters, and sprayers. Exemplary size presses that can be used include a puddle size press, a metering size press, a vertical size press, and a horizontal size press.

Now referring to FIG. 1, a schematic diagram showing a process for the manufacture of a heat seal adhesive paper product "on machine" is provided at reference number 10. It should be understood that the schematic diagram 10 is an exemplary schematic diagram and includes many of the operations carried out in commercial paper making facilities. The equipment used in a particular operation may vary from facility to facility, but it is expected that the general operations will be present. In addition, it should be understood that various additional steps, if desired, can be included in the paper making process.

The starting material generally includes wood pulp 14. The wood pulp can include a blend of hard wood fibers, soft wood fibers, or a mixture of hard wood fibers and soft wood fibers. The wood pulp 14 can be provided as cellulose fiber. The wood pulp can be provided as chemical pulped wood, and can include a blend of coniferous and deciduous trees. The wood pulp 14 can be processed through a refining operation 16 and through a cleaning operation 18 to form cleansed pulp 20. The cleansed pulp 20 can be applied through a head box 22 onto a paper making machine 24 such as a Fourdrinier machine to provide a paper base sheet 26. Additives can be added prior to or at the head box 22, and can be added prior to or during formation of the paper base sheet 26. The addition of additives prior to or at the head box 22, or prior to or during formation of the paper base sheet 26 can be referred to as "wet end chemistry." Wet end additives can be provided for sizing, wet strength, water-resistance, oil-resistance, or mixture thereof. Exemplary water-resistance additives include sizing agents. Exemplary sizing agents include rosin, alkyl ketene dimer (AKD), alkenyl succinic anhydride (ASA), stearylated melamine, wax emulsions, styrene maleic anhydride (SMA), latex, ethylene acrylic acid (EAA), cationic styrene-based polymers, or mixtures thereof. Exemplary oil-resistant additives include sizing agents such as fluorochemicals. Exemplary wet strength additives include urea formaldehyde resins, melamine formaldehyde resins, polyamides, polyethyleneimine resins, wet end latexes, size press latexes, or mixtures thereof. Exemplary polyamides include polyamide epichlorohydrin resins (PAE) such as that available under the name KYMENE from Hercules, and glyoxylated vinylamides such as that available under the name PAREZ 631 NC.

The paper base sheet 26 can be characterized as a non-woven web and can be considered continuous in the machine direction. The machine direction refers to the direction of travel of the non-woven web on the paper making machine 24. The transverse direction refers to the direction across the width of the paper base sheet 26.

The paper base sheet 26 can be processed through a wet press section 28 to remove water, and then through a dryer section 30 to further reduce the water content and provide a paper substrate 32 having a desired water content. The paper substrate 32 can be taken up in a roll and stored or shipped to another location, and the aqueous polymer dispersion can be applied to the paper substrate 32 off machine. Alternatively, the aqueous polymer dispersion can be applied to the paper substrate 32 on machine. Whether the aqueous polymer dispersion is applied to the paper substrate off machine or on machine, the paper substrate 32 resulting from the dryer section 30 can be further processed to add additives or treatments. The application of various additives or treatments is generally known in the art. For example, sizing agents can be added at a size press. The addition of additives at a size press can be referred to as "size press chemistry." Accordingly, the schematic diagram 10 can be modified to include additional steps of adding additives or treatments to the paper substrate.

FIG. 1 shows the application of the aqueous polymer dispersion to the paper substrate 32 on machine. The aqueous polymer dispersion can be applied to the paper substrate 32 using a size press 36 to form a heat seal adhesive paper product 42. The size press 36 can be provided as a puddle size press 37. The aqueous polymer dispersion can be applied to one or both sides of the paper substrate 32. The resulting coated paper 38 can be processed through a dryer section 40 to remove water to provide the heat seal adhesive paper product 42. The heat seal adhesive paper product 42 can be calendered at a calender roll 44 and can be taken up in a roll 46.

The dryer section 40 can be referred to as a contact dryer section because of the use of contact dryers 41 to drive water off the coated paper substrate 38. The contact dryers 41 include heated rolls that contact the surface of the coated paper substrate 38 containing the aqueous polymer dispersion. The heated rolls can be provided as steam cans. Steam cans are fairly commonly used in paper making. In general, steam runs through the steam cans to provide heating. By the time the coated substrate 38 leaves the drying section 40, it can achieve a temperature of up to about 200° F. By selecting the aqueous polymer dispersion, the resulting heat seal adhesive paper product 42 can be taken up in the roll 46 and later unrolled without exhibiting blocking problems. Blocking refers to the adhesion between layers of paper. In view of the temperatures typically achieved during the dryer section 40, one would expect that conventional adhesives that are applied off machine would result in blocking when the paper product is taken up in a roll, or would transfer to the heated rolls and cause sticking problems for the machinery and a decrease in heat transfer to the coated substrate 38.

Although the coated paper substrate can be dried on a contact dryer, non-contact dryers can be used to dry the coated substrate. Exemplary non-contact dryers include air dryers, infrared dryers, and gas dryers. It is convenient to use contact dryers for drying the coated paper substrate because paper making equipment commonly utilize contact dryers, and non-contact dryers can be fairly expensive. It is expected that the non-contact dryers are more commonly found off machine.

The aqueous polymer dispersion can be applied to one or both sides of the paper substrate. Whether the aqueous polymer dispersion is provided on one or both sides of the paper substrate can be selected depending upon the heat seal adhesive paper product will be used. If the heat seal adhesive paper product is to be used in an environment where both sides of the paper product require adhesive properties, then the aqueous polymer dispersion can be applied to both sides of the paper substrate. Exemplary laminate products that can utilize a heat seal adhesive paper product having adhesive properties on both sides include, for example, foil laminates, insulation facing, and three or more ply bags. When adhesive properties are only needed on one side of the heat seal adhesive paper product, the aqueous polymer dispersion can be applied to one side of the paper substrate. Exemplary laminate products that can include heat seal adhesive paper product having adhesive properties on one side include, for example, tape, linerless labels, one side foil laminate bags, and two ply bags. It is expected that many of the laminate products that require heat seal adhesive paper product having adhesive properties on one side can be satisfied with the use of heat seal adhesive paper product having adhesive properties on both sides.

The amount of the aqueous polymer dispersion applied to the paper substrate can be selected so that the resulting heat seal adhesive paper product provides the desired heat seal properties. Depending on the application of the heat seal adhesive paper, more or less aggressive adhesion may be desired. For example, a lower degree of adhesion may be sufficient when bonding the heat seal adhesive paper product to itself compared with bonding the heat seal adhesive paper to foil.

The amount of aqueous polymer dispersion applied to the paper substrate can vary depending on, for example, the level of adhesion desired for the resulting paper product and the amount of penetration of the aqueous polymer dispersion into the paper substrate. To minimize the amount of aqueous polymer dispersion applied to the paper substrate while achieving the desired level of heat seal properties for the resulting paper product, it can be desirable to reduce the amount of penetration of the aqueous polymer dispersion into the paper substrate. There may be reasons to allow or provide for penetration of the aqueous polymer dispersion into the paper substrate. For example, it may be desirable to provide a paper substrate having a more consistent or even distribution of the aqueous polymer dispersion. By way of example, the aqueous polymer dispersion can be applied to one side of the paper substrate at a solids weight of at least about 0.5 lb/3,000 ft$^2$ to achieve heat seal adhesion properties for the resulting paper product. The solids weight refers to the weight of the non-volatile components of the aqueous polymer dispersion. The non-volatile components of the aqueous polymer dispersion refers to those components that remain after drying. The non-volatile components includes the polymer component. The non-volatile components can be referred to as the solids components. The upper limit of the amount of aqueous polymer dispersion applied to the paper substrate may depend on the amount of the aqueous polymer dispersion that can be applied and taken up by the paper substrate. Paper substrates having different basis weights may be capable of taking up different amounts of the aqueous polymer dispersion. In general, it is expected that the paper substrate can take up a solids weight of the aqueous polymer dispersion on one side of the paper substrate of less than about 15 lb/3,000 ft$^2$. The solids weight of the aqueous polymer dispersion on one side of the paper substrate can be about 1 lb/3,000 ft$^2$ to about 8 lb/3,000 ft$^2$, and can be about 2 lb/3,000 ft$^2$ to about 6 lb/3,000 ft$^2$. It should be appreciated that these ranges refer to the application of the aqueous polymer dispersion on one side of the paper substrate. The other side of the paper substrate can additionally contain the aqueous polymer dispersion at these solids weight ranges. For example, the other side of the paper substrate can include a heat activatable adhesive at a solids weight of about 0.5 lb/3,000 ft$^2$ to about 15 lb/3,000 ft$^2$, about 1 lb/3,000 ft$^2$ to about 8 lb/3,000 ft$^2$, and about 2 lb/3,000 ft$^2$ to about 6 lb/3,000 ft$^2$. Accordingly, the paper substrate can include a heat activatable adhesive on one or both sides of the paper substrate.

The sides of a paper substrate can be referred to as the felt side and the wire side. The wire side refers to the side that contacts the wire onto which the fibers are deposited during the paper making process. As desired, the sides of the paper substrate can be referred to as a first side and as a second side. In addition, the aqueous polymer dispersion can be applied to the felt side, the wire side, or both the felt side and the wire side.

The aqueous polymer dispersion can be provided having a sufficiently high solids percent so that the resulting heat seal adhesive paper product exhibits desired heat seal properties. For example, the aqueous polymer dispersion can have a solids content of at least about 1 wt. %. The percent solids refers to the components that remain after the aqueous polymer dispersion has dried. In general, it can be desirable for the aqueous polymer dispersion to have a percent solids that is as high as possible. It is expected that the upper limit on the percent solids is selected to allow the aqueous polymer dispersion to flow adequately through the equipment used to apply the aqueous polymer dispersion to the paper substrate. By way of example, the percent solids of the aqueous polymer dispersion can be provided at a level of less than about 60 wt. % in order to provide the aqueous polymer dispersion with a viscosity that is sufficiently low so that the aqueous polymer dispersion can run through a size press. Exemplary ranges of solids content for the aqueous polymer dispersion include about 5 wt. % to about 50 wt. % and about 10 wt. % to about 40 wt. %. The lower limit of the solids percent can be selected to avoid unnecessary drying or removal of water after the aqueous polymer dispersion has been applied to the paper substrate.

The aqueous polymer dispersion can be selected so that the coated substrate can be processed using contact dryers and the resulting heat seal adhesive paper product can be taken up in a roll and then later used without exhibiting blocking. Blocking refers to the adhesion of one layer to another so that a layer of heat seal adhesive paper cannot be adequately recovered from the roll. The coated substrate refers to the paper substrate containing the aqueous polymer dispersion.

The aqueous polymer dispersion includes a polymer component having a sufficiently high glass transition temperature ($T_g$) so that the coated substrate can be processed without the processing equipment becoming sticky or the resulting heat seal adhesive paper product exhibiting blocking. The polymer component of the aqueous polymer dispersion can be selected so that it has a $T_g$ that is greater than about 50° F. A higher $T_g$ value may be more desirable to reduce transfer of the aqueous polymer dispersion to the processing equipment and to reduce blocking. For example, the polymer component of the aqueous polymer dispersion can have a $T_g$ greater than about 80° F., greater than about 90° F., greater than about 100° F., greater than about 110° F., greater than about 120° F., greater than about 125° F., or greater than about 130° F. The selection of the glass transition temperature can depend on the temperature that the coated paper substrate is heated during the drying step. The polymer component of the aqueous polymer dispersion can be selected so that it has a sufficiently high melting temperature ($T_m$) to reduce transfer of the polymer component to the processing equipment and to reduce blocking. The melting temperature refers to the temperature at which the polymer flows. For example, the polymer component of the aqueous polymer dispersion can have a $T_m$ that is greater than about 220° F. In addition, the polymer component of the aqueous polymer dispersion can be selected so that it has a $T_m$ of greater than 230° F., greater than about 240° F., or greater than about 250° F.

An exemplary polymer component that can be provided in the aqueous polymer dispersion can be referred to as a polyester, and can be characterized as relatively linear or relatively non-branched polyester. Exemplary aqueous polymer dispersions containing relatively linear and non-branched polyesters are available under the names SYNTHEBOND SP 254 and SYNTHEBOND SP248 from Resolution Specialty Materials. Another exemplary aqueous polymer dispersion containing polyester is available under the name EVCOTE from EVCO.

The aqueous polymer dispersion can be formulated by combining a polymer component and an aqueous composition. The aqueous polymer dispersion can include sizing components or binders or other components that may help keep the polymer component as part of the aqueous polymer dispersion. For example, a binder can help keep the polymer component in suspension. The polymer component can be provided as a solid polymer and can be added to the aqueous composition to form the aqueous polymer dispersion. Exemplary polymers that can be used to form the aqueous polymer dispersion include polyamides (e.g., nylon), copolyamides, vinyl acetate-ethylene copolymers, polyethylene, ethylene copolymers (e.g., ethylene acrylic acid copolymer (EAA) and ethylene ethyl acrylate copolymer (EEA)), polyester, copolyester, polyacrylic, polyvinyl acetate copolymer, polyvinyl chloride acrylate copolymer, phenolic polymer, polyurethane, and acrylonitrile polymer. The polymer component can be available as a solid (e.g., powder) and added to an aqueous composition for application to the paper substrate. Exemplary polymer solids or powders that can be used to form the aqueous polymer dispersion are available under the names 6E P1 copolyester from EMS-Griltex and D1377E P1 copolyester from EMS-Griltex. Exemplary presuspended solids are available under the names 2A copolyamide from EMS-Griltex and 9E copolyester from EMS-Griltex. The aqueous polymer dispersion can be provided as a latex. In general, a latex refers to an aqueous polymer dispersion that is relatively stable and may be provided as an emulsion.

The drying section 40 in FIG. 1 is shown having a plurality of steam cans 41 for drying the coated paper substrate 38. The steam running through the steam cans 41 can be provided at temperatures of about 200° F. to about 290° F. The final can or cans can achieve surface temperatures in excess of about 270° F. In view of the temperatures that can be achieved by the steam cans, it is desirable to keep the heat activatable adhesive below the heat bond activation temperature to avoid transfer of the adhesive to the steam cans and to avoid blocking when the heat seal adhesive paper product 42 is taken up in a roll 46.

The schematic diagram shown in FIG. 1 does not include a chill roll for reducing the temperature of the heat seal adhesive paper product 42 before it is taken up in a roll 46. The process can be provided with or without a chill roll prior to taking the paper product up in a roll. A chill roll may be advantageous to remove heat from the heat seal adhesive paper product 42 to reduce the possibility of blocking in the roll 46.

Figure 2:
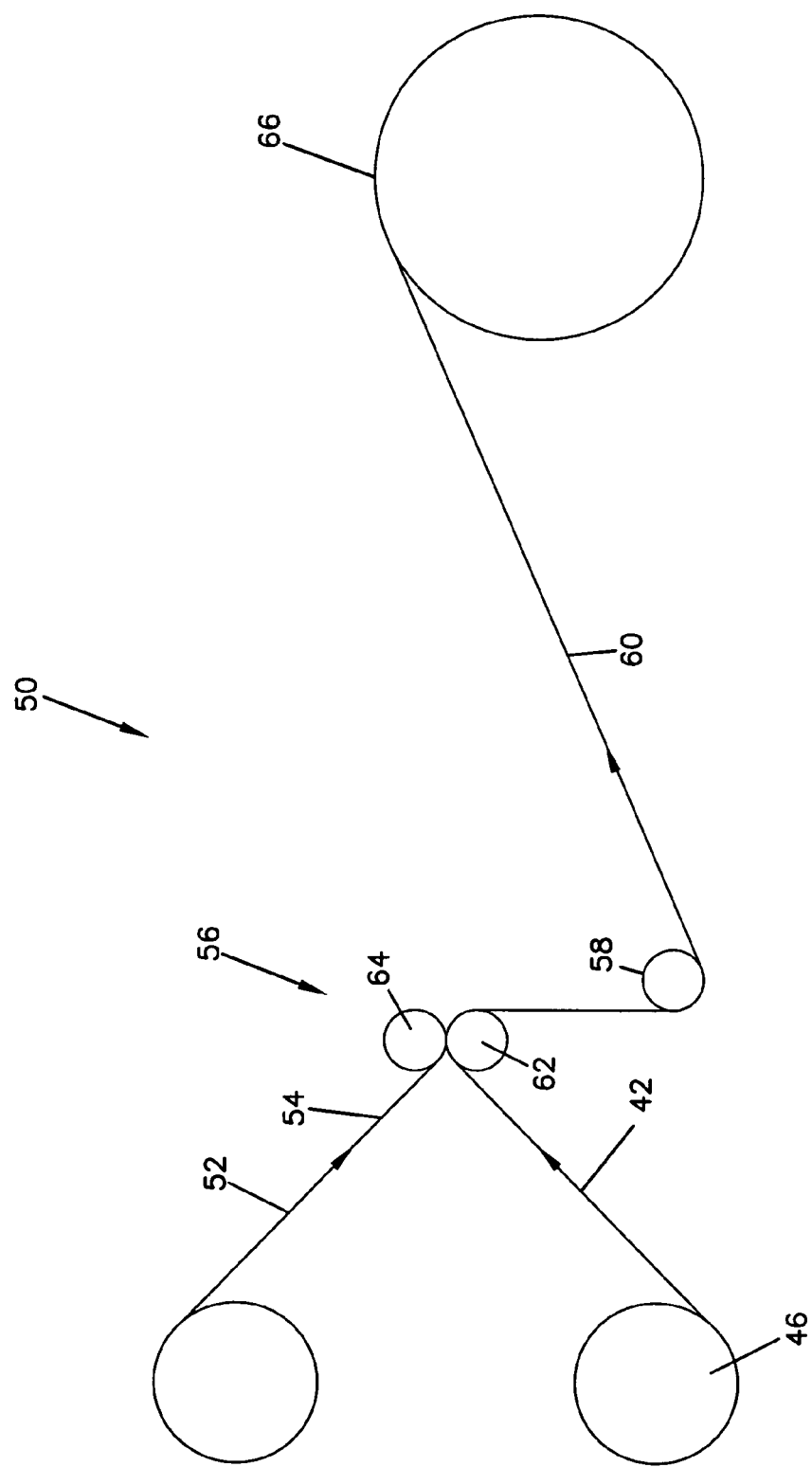
FIG. 2 is a diagrammatic view of an exemplary process for manufacturing a laminate according to the principles of the invention.

Now referring to FIG. 2, a process for forming a laminate product from the heat seal adhesive paper product 42 is shown at reference number 50. The heat seal adhesive paper product 42 (from roll 46) can be combined with another substrate 52 such as foil 54 and compressed at a heat nip 56. A roller 58 can be arranged so that the resulting laminate 60 spends more time on the heat nip 56. The heat nip 56 can include hot roll 62 and compression roll 64. Hot roll 62 can be heated by hot oil. The resulting laminate 60 can be taken up in a laminate roll 66. The resulting laminate 60 can be taken up in a laminate roll 66.

The heat nip 56 can provide sufficient temperature and pressure and time to the heat seal adhesive paper product 42 to cause the heat activatable adhesive layer to bond to the substrate 52. The heat nip 56 can be heated to a sufficient temperature to cause the heat activatable adhesive layer of the heat seal adhesive paper product 42 to become heat activated or an active adhesive for bonding to the substrate 52, and the residence time on the heat nip 56 and the pressure provided at the heat nip 56 can be sufficient to provide adhesion between the heat seal adhesive paper product 42 and the substrate 52. The surface temperature of the hot roll 62 can be provided at a sufficiently high temperature to cause the heat activatable adhesive layer to open or form an active adhesive for bonding with the substrate 52. The surface temperature of the hot roll 62 can be at least about 250° F. In addition, the surface temperature of the hot roll 62 can be at least about 300° F., or at least about 350° F. It is generally expected that the surface temperature of the hot roll 62 can be kept below a temperature that causes the paper product 42 to char. In general, the temperature of the hot roll 62 can be provided at less than about 500° F. to prevent paper charring. The hot roll 62 can be referred to as the platen. The pressure at the heat nip 56 can be provided as sufficient to cause the heat seal adhesive paper product 42 to bond to the substrate 52. In general, higher pressure provides better contact. If the pressure is too high, it is expected that the caliper of the laminate may be reduced or the adhesive may be squeezed out of the laminate. In general, the pressure can be at least about 1 psig, and can be less than about 500 psig. The pressure can be at least about 10 psig, and less than about 100 psig. The pressure can be about 20 psig to about 90 psig, or can be about 25 psig to about 70 psig. The residence time on the heat nip 56 can be provided as sufficient to allow the heat seal adhesive paper product 42 and the substrate 52 to adhere under given conditions of temperature and pressure. In general, it is expected that the residence time should be at least about 0.01 second to provide sufficient contact. In addition, in order to keep a line moving, the residence time can be selected as less than about 5 seconds. Exemplary residence times can be selected as about 0.1 second to about 4 seconds, and about 0.5 second to about 2 seconds. It should be understood that the conditions of bonding the heat seal adhesive paper product to the substrate can be selected to provide the heat activatable adhesive that exhibits a heat bond activation temperature sufficient to cause bonding between the heat seal adhesive paper product and the substrate.

Although the conditions of adhering a heat seal adhesive paper product to a substrate is described in the context of FIG. 2, it should be understood that the conditions can be used in a continuous bonding application or in a discrete or non-continuous bonding application. For example, the bonding can be done continuously as shown in FIG. 2, or the bonding can be done in a non-continuous application where, for example, a heat seal adhesive paper product having a particular shape is bonded to a substrate having a particular shape to form a laminate. In addition, the substrate can move through a heat nip or can be applied together at a stationary station where the substrates do not move relative to the heat nip or platen.

Figure 3:
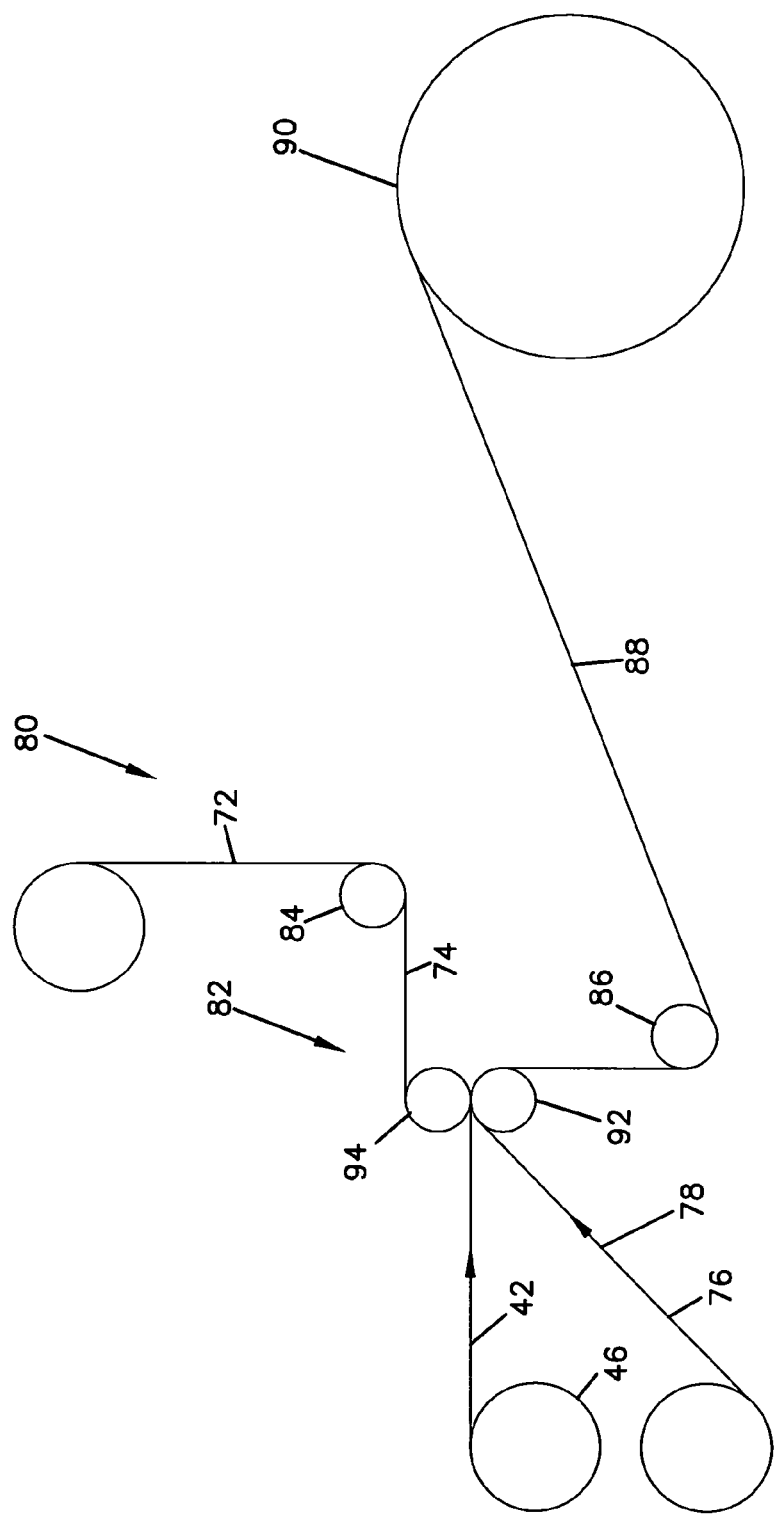
FIG. 3 is a diagrammatic view of an exemplary process for manufacturing a laminate according to the principles of the invention.

Now referring to FIG. 3, a process for forming a laminate product from the heat seal adhesive paper product 42 is shown at reference number 80. The heat seal adhesive paper product 42 can be combined with a first substrate 72 such as foil 74 and a second substrate 76 such as foil 78. The substrates can be compressed at a heat nip 82. The residence time on the heat nip 82 can be increased by using rollers 84 and 86. The resulting laminate product 88 can be taken up in a laminate roll 90.

The heat nip 82 can include a hot roll 92 and a hot roll 94. The hot rolls 92 and 94 can be heated by hot oil so that the heat activatable adhesive layer on both sides of the paper product 42 become activated so that sufficient adhesion occurs between the heat seal adhesive paper product 42 and the first substrate 72 and the second substrate 76. The conditions of temperature, pressure, and residence time can be selected as described above in the context of the techniques shown in FIG. 2.

Additives

The paper substrate can be processed to provide desired properties prior to application of the aqueous polymer dispersion for the formation of the heat activatable adhesive layer. Various additives can be provided in the paper substrate to provide desired properties. The introduction of additives to the pulp slurry prior to formation of the paper substrate can be referred to as wet end chemistry. The addition of additives subsequent to the formation of the paper substrate can be referred to as size press chemistry. It should be understood that the reference to size press chemistry is not a requirement of the use of a size press. Various other devices can be used to introduce additives to the paper substrate. One common type of equipment used is a size press. Alternative equipment for applying additives to a paper substrate include roll coaters, gate-roll coaters, blade coaters, and sprayers. Various size presses are available including metering size presses and puddle size presses. When additives are added during the papermaking process, the addition can be referred to as "on machine." When the additives are added after the paper substrate has been formed and moved to a separate line, the addition can be referred to as "off machine."

Additives can be provided in wet end chemistry for imparting strength, opacity, color, bulk, etc. Exemplary wet strength additives include urea-formaldehyde, melamine-formaldehyde, polyamide, polyimine, polyethyleneimine (PEI), wet end latexes, size press latexes, or mixtures thereof. Exemplary polyamides include polyamide epichlorohydrin resins (PAE) such as that available under the name KYMENE from Hercules, and glyoxylated vinylamides such as that available under the name PAREZ 631 NC. Exemplary dry strength additives include starches (such as cationic potato starch). One of skill in the art will appreciate that many different types of starches can be used such as corn starch, rice starch, tapioca starch, and wheat starch. Exemplary colorants include dyes, pigments, and opacifying color additives. Exemplary opacifying additives include kaolin clays, titanium dioxide, and calcium carbonate. One of skill in the art will appreciate that these components may be added in many different ways including being added as a part of a batch control process or being added through a metering system for continuous operations. Other components, such as defoaming agents, pitch dispersants, plasticizers (urea), etc. may also be added prior to the head box. Alum (aluminum sulfate), or acid alum (aluminum sulfate and sulfuric acid) may be added prior to the head box. Acid alum can serve various purposes including drainage enhancement, rosin sizing, part of certain retention aid programs, dye fixation, cationic source, acidic buffer. Sizing agents that increase water hold-out are also sometimes added as a part of wet end chemistry. Bulking agents can be added as a part of wet-end chemistry.

Additives can be provided in size press chemistry for imparting size, strength, color, to close up the surface of the sheet (film formers such as sodium alginate), to fill in the surface of the sheet, for water resistance, and/or oil resistance. Exemplary water resistance additives include rosin, alkyl ketene dimer (AKD), alkenyl succinic anhydride (ASA), stearylated melamine, wax emulsions, styrene maleic anhydride (SMA), latex, ethylene acrylic acid (EAA), cationic styrene-based polymers, or mixtures thereof. Exemplary oil resistance additives include fluorochemicals and modified starches (e.g., octyenyl succinic anhydride modified starches). Exemplary fillers include kaolin clays, titanium dioxide, and calcium carbonate. Plasticizers may also be added at the size press 50. Plasticizers include humectants and can function to keep paper soft and make it less likely that the paper will fracture. Suitable plasticizers include urea, nitrates, glycerine, and saccharides.

It should be understood that when additives are introduced into the paper substrate by size press chemistry, the method for manufacturing the heat seal adhesive paper product as shown in FIG. 1 can be modified to include a step of introducing the size press chemistry onto the paper substrate 32 resulting from the dryer section 30. In addition, an additional dryer section can be added so that the resulting paper substrate has a desired water content prior to application of the aqueous polymer dispersion to provide the coated paper 38.

Web of Fibers

The fibers used to form the paper substrate can be selected to provide the paper substrate with desired properties. One of skill in the art will appreciate that the web of fibers can comprise many different types of fibers, both natural and synthetic. Natural fibers from plants can often be referred to as cellulosic fibers. Exemplary natural fibers that can be used include wood fibers and non-wood natural fibers such as vegetable fibers, cotton, various straws (wheat, rye, and others), various canes (bagasse and kenaf), grasses (bamboo, etc.), hemp, corn stalks, etc. Exemplary synthetic fibers that can be used include polyester fibers, bicomponent fibers, polyethylene fibers, rayon fibers, lyocell fibers, polypropylene fibers, acrylic fibers, and polyvinyl alcohol fibers.

The pulp used for creating the web of fibers can include hardwood fibers, softwood fibers, or a blend of hardwood and softwood fibers. The pulp can be provided as cellulose fiber from chemical pulped wood, and can include a blend from coniferous and deciduous trees. By way of example, the fibers can be from northern hardwood, northern softwood, southern hardwood, or southern softwood. Hardwood fibers tend to be more brittle but are generally more cost effective for use because the yield for pulp from hardwood is higher than the yield for pulp from softwood. The pulp can contain about 0 to about 70% hardwood fibers based on the weight of the fibers. Softwood fibers have desired paper making characteristics but are generally more expensive than hardwood fibers. The pulp can contain about 0 to about 100% softwood fibers based on the weight of the fibers. The pulp can contain a blend of hardwood and softwood fibers.

The natural fibers used in the invention can be extracted with various pulping techniques. For example, mechanical or high yield pulping can be used for stone ground wood, pressurized ground wood, refiner mechanical pulp, and thermomechanical pulp. Chemical pulping can be used incorporating kraft, sulfite, and soda processing. Semi-chemical and chemi-mechanical pulping can also be used which includes combinations of mechanical and chemical processes to produce chemi-thermomechanical pulp.

The fibers can also be bleached or unbleached. One of skill in the art will appreciate that the bleaching can be accomplished through many methods including the use of chlorine, hypochlorite, chlorine dioxide, oxygen, peroxide, ozone, or a caustic extraction.

The pulp can also include post-consumer waste (PCW) fiber. Post-consumer waste fiber is recovered from paper that is recycled after consumer use. Post-consumer waste fiber can include both natural and synthetic fiber. Incorporation of PCW fiber can aid in efficient use of resources and increase the satisfaction of the end user. The pulp can additionally include synthetic fibers. The incorporation of synthetic fibers can aid in strength and absorbency.

Refining is the treatment of pulp fibers to develop their papermaking properties. Refining increases the strength of fiber to fiber bonds by increasing the surface area of the fibers and making the fibers more pliable to conform around each other, which increases the bonding surface area and leads to a denser sheet, with fewer voids. Most strength properties of paper increase with pulp refining, since they rely on fiber to fiber bonding. The tear strength, which depends highly on the strength of the individual fibers, actually decreases with refining. Refining of pulp increases the fibers flexibility and leads to denser paper. This means bulk, opacity, and porosity decrease (densometer values increase) with refining. Fibrillation is a result of refining paper fibers. Fibrillation is the production of rough surfaces on fibers by mechanical and/or chemical action; refiners break the outer layer of fibers, e.g., the primary cell wall, causing the fibrils from the secondary cell wall to protrude from the fiber surfaces.

The fibers can be refined so that the resulting paper (including synthetic fiber) provides the desired Canadian Standard Freeness value. In general, less refined paper has more holes and voids than a more refined paper. To reduce penetration of a coating into the paper substrate, it may be desirable to provide a desired level of refining to reduce the presence of holes and voids.

The basis weight of a paper refers to the weight per unit area of the web of fibers with additives that may be introduced either or both wet end chemistry and size press chemistry, but before the introduction of aqueous polymer dispersion. In general, the basis weight can be selected to provide the paper product having the desired properties for a particular application. In certain applications it may be desirable to provide paper from a heavier basis weight web of fibers compared with another application. Accordingly, a general range for selecting the basis weight of the web of fibers can be about 10 lbs./3000 ft$^2$ to about 150 lbs./3000 ft$^2$, or about 20 lbs./3000 ft$^2$ to about 90 lbs./3000 ft$^2$. In general, any weight of paper may be used in accordance with the present invention. However, using a paper substrate that is heavier than necessary for a particular application may not be economical.

Laminate Products

The heat seal adhesive paper product can be used in a variety of applications where it is desirable to heat seal the paper product to a second substrate to form a laminate product. The second substrate can be a paper substrate identical to the paper substrate that forms the heat seal adhesive paper product or a substrate different from the paper substrate that forms the heat seal adhesive paper product. In addition, the second substrate can be another heat seal adhesive paper product. The heat seal adhesive paper product can be provided having the heat activatable adhesive layer on one side and can be provided having printing or some form of graphics display on the other side. Exemplary applications for the heat seal adhesive paper product include the production of barrier products, containment products, tape products, and label products.

Exemplary barrier products include foil/paper laminates. Foil/paper laminates include those laminates having foil bonded to paper on one side of the paper and foil bonded to paper on both sides of the paper. Foil refers to metal or metallic films. For example, thin sheets of aluminum can be referred to as aluminum foil. Foil/paper laminates are useful in applications where is it desirable to provide a low moisture vapor transmission rate (MVTR), grease resistance, or oxygen transmission properties. It should be understood that a reference to a foil/paper laminate product includes laminate products that include additional layers. For example, a foil/paper laminate product includes a foil/paper/foil laminate product, a paper/foil/paper laminate product, a film/foil/paper laminate product, etc. In general, foil offers a desirable low MVTR and it is useful to laminate the foil to a paper substrate to provide the foil with strength and substance. Exemplary applications for foil/paper laminates include insulation facing, ice cream cone sleeves, composite can liners, composite can labels, liners for a tube such as a caulking tube, and decorative packaging. Additional laminate products include the heat seal adhesive paper product bonded to second substrates that can be characterized as paper or polymer to provide desired barrier properties.

The heat seal adhesive paper product can be used to form containment products. In general, containment products include heat sealable bags, pouches, and containers. The heat seal adhesive paper product can be used to form pouches for containing food products such as sugar, breakfast food such as oatmeal, popcorn, tea, or coffee. The heat seal adhesive paper product can be used to provide both barrier and containment properties. For example, the heat seal adhesive paper product can be bonded to a second substrate to provide a laminate product having grease barrier properties, and the laminate product can be used to form a microwavable popcorn bag. For example, two heat seal adhesive paper products (e.g., 12 lbs./3,000 ft$^2$ each) can be bonded together to form a microwavable popcorn bag. Another containment product includes an article wrap. In general, an article wrap refers to a laminate product that wraps an article to protect the article. An exemplary article wrap includes ream wrap for wrapping a ream of paper and protecting the paper from elements. The article wrap can provide a heat seal to itself. That is, the article wrap can wrap an article and bond to itself so that it stays wrapped. An exemplary type of heat seal adhesive paper product can include roll headers.

The heat seal adhesive paper product can be used to package or contain food. An exemplary food container that can include the heat seal adhesive paper product includes popcorn bags. The disclosure of U.S. application Ser. No. 10/730,875 that was filed with the United States Patent and Trademark Office on Dec. 8, 2003, relating to the use of a paper product in the formation of a microwave popcorn bag is incorporated herein by reference in its entirety. When forming the microwave popcorn bag, it may be desirable to laminate the heat seal adhesive paper product with a film layer to provide resistance to oil penetration.

The heat seal adhesive paper product can be used to provide medical heat seal paper. Four general areas of medical heat seal paper include light duty medical paper, heavy duty medical paper, and lidding stock medical paper. In general, light duty medical paper can be used to provide packaging for relatively light weight medical products for the consumer market. The heavy duty medical paper can be used to provide packaging for medical articles for use in hospitals, clinics, and medical offices. Lidding stock medical paper can be used to provide a lid on trays that contain medical equipment. In general, it is desirable to provide the heat seal adhesive paper product with as low a weight as possible to provide the desired properties. Because of the use of the heat seal adhesive paper product in the medical field, it may become necessary to subject the heat seal adhesive paper product or the resulting laminate to sterilization and it may be necessary to provide the heat seal adhesive paper product or the resulting laminate so that it passes a bacterial filtration efficiency protocol. Exemplary sterilization techniques include steam sterilization, ethylene oxide sterilization, gamma ray sterilization, and electron beam sterilization. Accordingly, the heat seal adhesive paper product and the resulting laminate may be constructed so that it is compatible with at least one of the sterilization techniques.

Light duty medical paper can be used to provide packaging for use in the consumer market. Exemplary packages can be used to contain gauze, bandages, etc. The heat seal adhesive paper product can be laminated to itself or to an uncoated web to form a pouch or container. The heat seal adhesive paper product can have a weight that is sufficiently high to provide desired strength properties such as tear strength. In addition, the heat seal adhesive paper product can have a weight that is sufficiently low so that the paper product is not too expensive. An exemplary basis weight for the paper product can be about 15 lbs/3,000 ft$^2$ to about 35 lbs/3,000 ft$^2$.

The heavy duty medical paper can be provided for applications where a more robust package is desired than that used in consumer markets. For example, the heavy duty medical paper can be used to provide a more substantive packaging for gloves, medical instruments, gauze, bandages, etc. The heat seal adhesive paper product can be laminated to another web to provide an aggressive cohesive system where release is available but the release is tamper evident. That is, once the layers of the webs have been pulled apart, it is evident that they have been pulled apart. The heat seal adhesive paper product can be laminated to a film or an uncoated paper substrate to provide a direct seal. Examples of films include high density polyethylene and low density polyethylene. In general, the weight of the heat seal adhesive paper product for use in heavy duty medical paper should be sufficiently high to provide desired tear strength. The basis weight of the paper product can be about 30 lbs/3,000 ft$^2$ to about 50 lbs/3,000 ft$^2$.

The heat seal adhesive paper product can be used to provide lidding stock. In general, lidding stock refers to the substrate applied over a tray to seal the tray. Examples of components that may be packaged in a tray include medical equipment such as operating equipment, implantable devices such as pacemakers, etc. The tray can be provided as a soft tray or a hard tray. In general, a soft tray can be used to package a medical instrument that is structurally sound but bulky. A hard tray can be used to package medical equipment that requires more protection. In general, when the heat seal adhesive paper product is used as lidding stock for a soft tray, it can have a basis weight of about 40 lbs/3,000 ft$^2$ to about 60 lbs/3,000 ft$^2$. When the heat seal adhesive paper product is used to lidding stock for a hard tray, it can have a basis weight of about 45 lbs/3,000 ft$^2$ to about 75 lbs/3,000 ft$^2$.

In the case of medical applications, it can be desirable for the seal to provide a clean peel when layers are separated. The reason for this is that it may be desirable to avoid having loose fibers floating around in a sterile environment. Accordingly, a seal strength can be provided having a value of about 400 to about 700 grams/inch wide strip according to TAPPI T540.

The heat seal adhesive paper product can be used to form a heat seal tape. In general, a tape can be provided for holding two substrates together, or it can be provide masking or labeling of a surface. Exemplary types of tape that can be provided using the heat seal adhesive paper product include packaging tape, fiber reinforced tape, and masking tape. When the heat seal tape is used to provide labeling, it can be referred to as a label. A label can have printing on one side and the heat activatable adhesive layer on the other side. Exemplary applications for label include industrial applications and domestic applications. Industrial applications include applying labels to products or packages. Various products may be labeled, as desired by the manufacturer, distributor, or owner of the product. In addition, labeling can be used on packages such as boxes, parcels, envelopes to facilitate shipping of the product. The labels can be applied using automated equipment or the labels can be applied individually using for example, an iron or another form of heat applicator to heat the heat seal adhesive paper product so that the heat activatable adhesive becomes active.

The heat seal adhesive paper product can have a basis weight that is desirable for its intended use as a heat seal tape. When provided as a masking tape, the heat seal adhesive paper product can have a basis weight of about 15 lbs/3,000 ft$^2$ to about 100 lbs/3,000 ft$^2$, and when provided as a label, the heat seal adhesive paper product can have a basis weight of about 20 lbs/3,000 ft$^2$ to about 100 lbs/3,000 ft$^2$. In addition, when provided as a label, the heat seal adhesive paper product can have a basis weight of about 30 lbs/3,000 ft² to about 60 lbs/3,000 ft².

The above specification is a complete description of the manufacture and use of the composition of the invention. Since many embodiments in the invention can be made without departing from the spirit and scope of the invention, the invention resides in the claims hereinafter appended.

We claim:

1. A heat seal adhesive paper product comprising a paper substrate and a layer of heat activatable adhesive on a first side of the paper substrate and a layer of heat activatable adhesive on the second side of the paper substrate, wherein the heat activatable adhesive comprises a result of applying an aqueous polymer dispersion to the paper substrate to form a coated paper substrate and drying the coated paper substrate by contacting the coated paper substrate with contact drying rolls, and the aqueous polymer dispersion comprises a polymer component having a melting temperature ($T_m$) greater than about 240° F. and a glass transition temperature ($T_g$) greater than about 120° F., wherein the polymer component comprises at least one of polyamide, copolyamide, polyester, or copolyester.

2. A heat seal adhesive paper product according to claim 1, wherein the heat seal adhesive paper product exhibits a heat bond activation temperature when contacted with a hot roll or platen having a surface temperature greater than about 250° F. for at least about 0.05 second at a pressure of at least about 1 psig.

3. A heat seal adhesive paper product according to claim 1, wherein the heat activatable adhesive is provided on one side of the paper substrate at a solids weight of about 0.5 lb/3,000 ft² to about 15 lb/3,000 ft².

4. A heat seal adhesive paper product according to claim 1, wherein the heat activatable adhesive is provided on one side of the paper substrate at a solids weight of about 1 lb/3,000 ft² to about 8 lb/3,000 ft².

5. A heat seal adhesive paper product according to claim 1, wherein the paper substrate comprises paper having a basis weight of about 10 lbs./3000 ft² to about 150 lbs./3000 ft².

6. A heat seal adhesive paper product according to claim 1, wherein the heat activatable paper product is provided in the form of a roll.

7. A heat seal adhesive paper product according to claim 1, wherein the heat activatable adhesive is provided on the first side of the paper substrate at a solids weight of about 0.5 lb/3,000 ft² to about 15 lb/3,000 ft², and is provided on the second side of the paper substrate at a solids weight of about 0.5 lb/3,000 ft² to about 15 lb/3,000 ft².

8. A heat seal adhesive paper product according to claim 1, wherein the polymer component comprises polyester.

9. A heat seal adhesive paper product according to claim 8, wherein the polymer component has a glass transition temperature greater than about 125° F.

10. A heat seal adhesive paper product according to claim 1, wherein the paper substrate comprises a paper having a basis weight of about 15 lb/3000 ft² to about 35 lb/3000 ft².

11. A heat seal adhesive paper product according to claim 1, wherein the paper substrate comprises a paper having a basis weight of about 30 lb/3000 ft² to about 50 lb/3000 ft².

12. A heat seal adhesive paper product according to claim 1, wherein the paper substrate comprises a paper having a basis weight of about 40 lb/3000 ft² to about 60 lb/3000 ft².

13. A heat seal adhesive paper product according to claim 1, wherein the paper substrate comprises a paper having a basis weight of about 15 lb/3000 ft² to about 100 lb/3000 ft².

14. A heat seal adhesive paper product according to claim 1, wherein the heat activatable adhesive is kept below the heat bond activation temperature during drying the coated paper by contacting the coated paper substrate with contact drying rolls.

15. A heat seal adhesive paper product according to claim 1, wherein the polymer component comprises a linear polyester.

* * * * *